US012643805B2

(12) United States Patent
Nap

(10) Patent No.: US 12,643,805 B2
(45) Date of Patent: *Jun. 2, 2026

(54) PORTABLE SYSTEM FOR PURIFICATION OF LIQUIDS

(71) Applicant: Kyle Nap, Irving, TX (US)

(72) Inventor: Kyle Nap, Irving, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/333,318

(22) Filed: Jun. 12, 2023

(65) Prior Publication Data

US 2023/0365450 A1    Nov. 16, 2023

Related U.S. Application Data

(63) Continuation of application No. 16/347,576, filed as application No. PCT/US2017/060151 on Nov. 6, 2017, now Pat. No. 11,685,678.

(Continued)

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/001* (2013.01); *C02F 1/004* (2013.01); *C02F 1/24* (2013.01); *C02F 1/283* (2013.01); *C02F 1/441* (2013.01); *C02F 1/444* (2013.01); *C02F 1/56* (2013.01); *C02F 1/66* (2013.01); *C02F 1/722* (2013.01); *C02F 1/76* (2013.01); *C02F 2101/32* (2013.01); *C02F 2103/08* (2013.01); *C02F 2103/10* (2013.01); *C02F 2201/007* (2013.01);
(Continued)

(58) Field of Classification Search
CPC .. C02F 9/00; C02F 1/001; C02F 1/004; C02F 1/24; C02F 1/283; C02F 1/441; C02F 1/444; C02F 1/56; C02F 1/66; C02F 1/722; C02F 1/76; C02F 2101/32; C02F 2103/08; C02F 2103/10; C02F 2201/007; C02F 2201/008; C02F 2209/006; C02F 2209/008; C02F 2209/04; C02F 2209/06; C02F 2209/10; C02F 2209/11; C02F 2209/22; C02F 2303/16; C02F 2303/24; C02F 2305/08
See application file for complete search history.

(56) References Cited

U.S. PATENT DOCUMENTS 911,314 A    2/1909  Maranville
2,585,878 A    2/1952  Tryon
(Continued)

FOREIGN PATENT DOCUMENTS

CA        2183146        2/1998
CN    207243647 U        4/2018
(Continued)

OTHER PUBLICATIONS

Office Action dated Jul. 17, 2023; U.S. Appl. No. 17/102,375, filed Nov. 23, 2020; 31 pages.
(Continued)

*Primary Examiner* — Hayden Brewster
(74) *Attorney, Agent, or Firm* — Conley Rose, P.C.; J. Robert Brown, Jr.

(57) ABSTRACT

The present invention provides a system for high throughput purification of liquid.

21 Claims, 10 Drawing Sheets

Related U.S. Application Data

(60) Provisional application No. 62/418,193, filed on Nov. 6, 2016.

(51) Int. Cl.

| | |
|---|---|
| *C02F 1/24* | (2023.01) |
| *C02F 1/28* | (2023.01) |
| *C02F 1/44* | (2023.01) |
| *C02F 1/56* | (2023.01) |
| *C02F 1/66* | (2023.01) |
| *C02F 1/72* | (2023.01) |
| *C02F 1/76* | (2023.01) |
| *C02F 101/32* | (2006.01) |
| *C02F 103/08* | (2006.01) |
| *C02F 103/10* | (2006.01) |

(52) U.S. Cl.
CPC .. *C02F 2201/008* (2013.01); *C02F 2209/006* (2013.01); *C02F 2209/008* (2013.01); *C02F 2209/04* (2013.01); *C02F 2209/06* (2013.01); *C02F 2209/10* (2013.01); *C02F 2209/11* (2013.01); *C02F 2209/22* (2013.01); *C02F 2303/16* (2013.01); *C02F 2303/24* (2013.01); *C02F 2305/08* (2013.01)

(56) References Cited

U.S. PATENT DOCUMENTS

| | | | |
|---|---|---|---|
| 2,759,607 | A | 8/1956 | Boyd et al. |
| 2,782,929 | A | 2/1957 | Colket |
| 3,474,910 | A | 10/1969 | Schmerler et al. |
| RE28,458 | E | 7/1975 | Ross |
| 3,910,500 | A | 10/1975 | Hardison |
| 4,111,805 | A | 9/1978 | Van Pool et al. |
| 4,139,473 | A | 2/1979 | Alldredge |
| 4,246,119 | A | 1/1981 | Alldredge |
| 4,282,256 | A | 8/1981 | Evich et al. |
| 4,336,141 | A | 6/1982 | Santora |
| D296,352 | S | 6/1988 | Luzenberg |
| 5,244,579 | A | 9/1993 | Horner et al. |
| 5,547,584 | A | 8/1996 | Capehart |
| 5,895,576 | A | 4/1999 | Yamasaki et al. |
| 6,344,146 | B1 | 2/2002 | Moorehead et al. |
| 6,383,389 | B1 | 5/2002 | Pilgram et al. |
| 6,921,478 | B2 | 7/2005 | Lambert et al. |
| 6,936,176 | B1 | 8/2005 | Greene, III et al. |
| 7,510,661 | B2 | 3/2009 | Hills |
| 8,372,274 | B2 | 2/2013 | Early et al. |
| 8,388,850 | B2 | 3/2013 | Delano |
| 9,180,411 | B2 | 11/2015 | Prakash et al. |
| 9,255,025 | B2 | 2/2016 | Smiddy et al. |
| 9,751,790 | B2 | 9/2017 | McCabe et al. |
| 11,685,678 | B2 * | 6/2023 | Nap ............... C02F 9/00 |
| | | | 210/703 |
| 2003/0038084 | A1 | 2/2003 | Mitchell et al. |
| 2003/0057155 | A1 | 3/2003 | Husain et al. |
| 2003/0121846 | A1 | 7/2003 | Use et al. |
| 2004/0060860 | A1 | 4/2004 | Peterson et al. |
| 2005/0109697 | A1 | 5/2005 | Olivier |
| 2007/0029238 | A1 | 2/2007 | Duby |
| 2007/0209999 | A1 | 9/2007 | Smith et al. |
| 2009/0289011 | A1 | 11/2009 | Avakian |
| 2010/0187186 | A1 | 7/2010 | Howdeshell et al. |
| 2010/0320159 | A1 | 12/2010 | Lee et al. |
| 2011/0005999 | A1 | 1/2011 | Randal |
| 2011/0089123 | A1 | 4/2011 | Kennedy et al. |
| 2012/0312755 | A1 | 12/2012 | Ryan et al. |
| 2013/0048548 | A1 | 2/2013 | Dreher et al. |
| 2013/0081984 | A1 | 4/2013 | Cordua |
| 2013/0112626 | A1 | 5/2013 | Lambert et al. |
| 2013/0313191 | A1 | 11/2013 | Wolf et al. |
| 2014/0021137 | A1 | 1/2014 | Smiddy et al. |
| 2014/0116942 | A1 | 5/2014 | Gordon et al. |
| 2014/0319036 | A1 | 10/2014 | Mane et al. |
| 2015/0083652 | A1 | 3/2015 | Hawks |
| 2015/0151998 | A1 | 6/2015 | Stevenson et al. |
| 2015/0166382 | A1 | 6/2015 | Fitzgerald et al. |
| 2016/0023934 | A1 | 1/2016 | Smith et al. |
| 2016/0060137 | A1 | 3/2016 | Yang |
| 2016/0115062 | A1 | 4/2016 | Krieger |
| 2016/0176737 | A1 | 6/2016 | Erickson |
| 2016/0194221 | A1 | 7/2016 | Randal |
| 2016/0221842 | A1 | 8/2016 | Rau, III |
| 2017/0001131 | A1 | 1/2017 | Bosisio et al. |
| 2017/0022728 | A1 * | 1/2017 | Simik ............... G05D 1/43 |
| 2017/0120170 | A1 | 5/2017 | Desmottes |
| 2018/0099237 | A1 | 4/2018 | Silverwood et al. |
| 2018/0141838 | A1 | 5/2018 | Ben-Shalom et al. |
| 2019/0099704 | A1 | 4/2019 | Amburgey et al. |
| 2019/0292082 | A1 | 9/2019 | Nap |
| 2020/0230522 | A1 | 7/2020 | Johnson |
| 2020/0230615 | A1 | 7/2020 | Melling et al. |
| 2021/0069615 | A1 | 3/2021 | Nap |
| 2025/0041766 | A1 | 2/2025 | Nap |

FOREIGN PATENT DOCUMENTS

| | | |
|---|---|---|
| CN | 207375851 U | 5/2018 |
| JP | 2006000763 A | 1/2006 |
| JP | 5914113 B2 | 5/2016 |
| KR | 20160071505 A | 6/2016 |
| WO | 2018085763 A1 | 5/2018 |

OTHER PUBLICATIONS

Evoqua; "Odyssey High Rate Sand Filtration with Top Tank Connections"; 2017; 2 pages.

The Water Treatments; "Water Filter"; Retrieved from: https://www.thewatertreatments.com/water-treatment-filtration/pressure-filter-water-filtration/; 2015; 3 pages.

"Suez;" "FiltraFast Extreme-Rate Compressible Media Filter"; Retrieved from: https://www.suez.com/en/news/ press-releases/suez-announcesseveral-contracts-and-innovative-technologies-in-watertreatment-for-industry; 2017; 6 pages.

Office Action dated Jan. 28, 2022; U.S. Appl. No. 16/347,576, filed May 4, 2019; 25 pages.

Final Office Action dated Sep. 2, 2022; U.S. Appl. No. 16/347,576, filed May 4, 2019; 21 pages.

Advisory Action dated Jan. 18, 2023; U.S. Appl. No. 16/347,576, filed May 4, 2019; 12 pages.

Notice of Allowance dated Feb. 10, 2023; U.S. Appl. No. 16/347,576, filed May 4, 2019; 15 pages.

Office Action dated Jan. 15, 2021; U.S. Appl. No. 17/102,375, filed Nov. 23, 2020; 19 pages.

Final Office Action dated Apr. 16, 2021; U.S. Appl. No. 17/102,375, filed Nov. 23, 2020; 12 pages.

Office Action dated Aug. 9, 2021; U.S. Appl. No. 17/102,375, filed Nov. 23, 2020; 26 pages.

Final Office Action dated Jan. 28, 2022; U.S. Appl. No. 17/102,375, filed Nov. 23, 2020; 22 pages.

Office Action dated Jun. 30, 2022; U.S. Appl. No. 17/102,375, filed Nov. 23, 2020; 23 pages.

Final Office Action dated Feb. 13, 2023; U.S. Appl. No. 17/102,375, filed Nov. 23, 2020; 29 pages.

PCT International Search Report & Written Opinion of the International Searching Authority; PCT/US17/60151; Feb. 26, 2018; 11 pages.

Bolivian Office Action; Application No. SP244-2017; Dec. 14, 2020; 7 pages.

Bolivian Office Action; Application No. SP244-2017; Jan. 14, 2022; 12 pages.

Bolivian Office Action; Application No. SP244-2017; Feb. 23, 2023; 9 pages.

PCT International Search Report & Written Opinion of the International Searching Authority; PCT/US19/033437; Jul. 30, 2019; 9 pages.

(56)  References Cited

OTHER PUBLICATIONS

Nap, Kyle; U.S. Appl. No. 18/496,204, filed Oct. 27, 2023; Title:
Solids Removal System and Method; 35 pages.
Notice of Allowance dated Feb. 22, 2024; U.S. Appl. No. 17/102,375,
filed Nov. 23, 2020; 12 pages.
Office Action dated Jan. 13, 2026; U.S. Appl. No. 18/496,204, filed
Oct. 27, 2023; 6 pages.

* cited by examiner

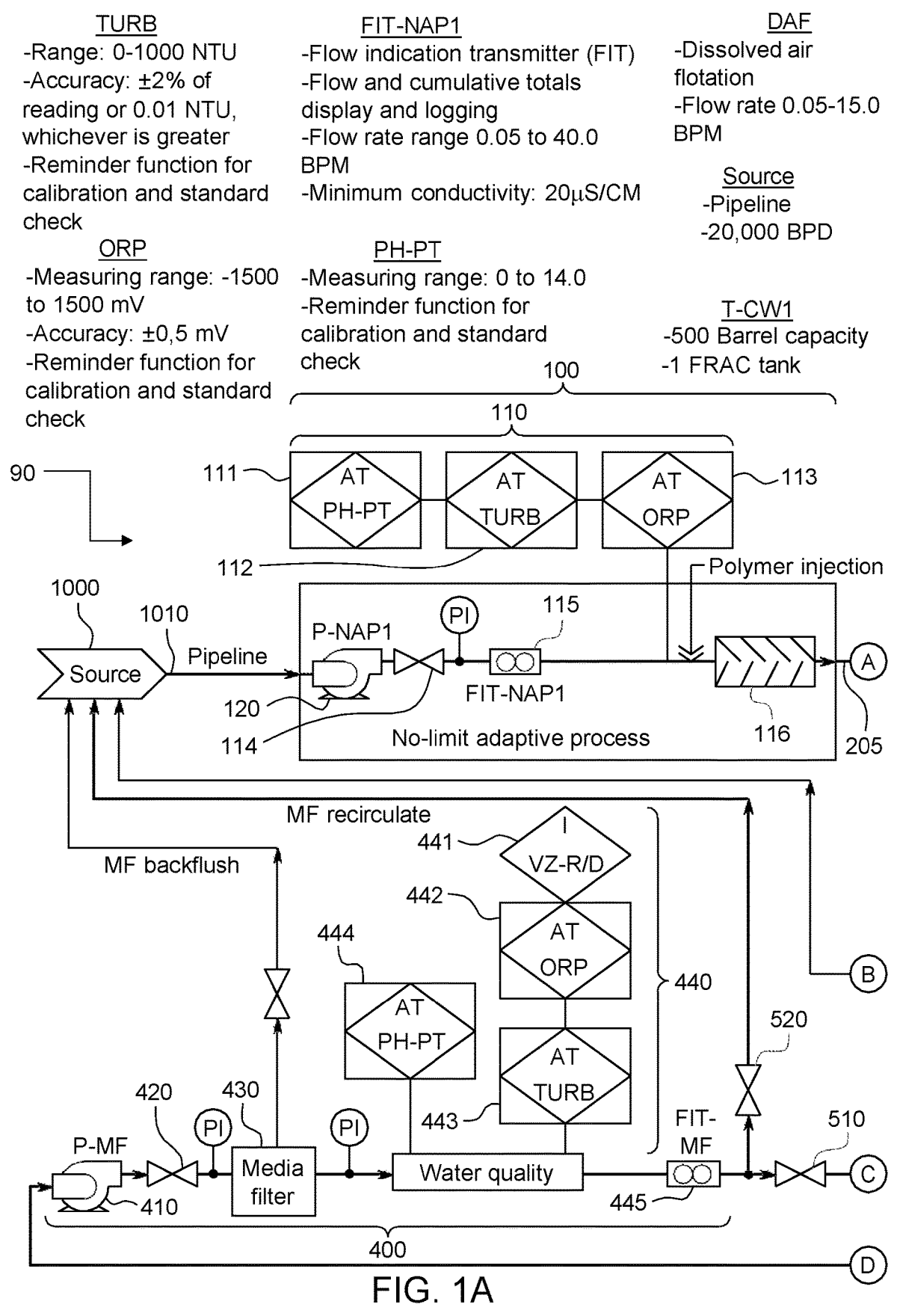

TURB
-Range: 0-1000 NTU
-Accuracy: ±2% of reading or 0.01 NTU, whichever is greater
-Reminder function for calibration and standard check ORP
-Measuring range: -1500 to 1500 mV
-Accuracy: ±0,5 mV
-Reminder function for calibration and standard check FIT-NAP1
-Flow indication transmitter (FIT)
-Flow and cumulative totals display and logging
-Flow rate range 0.05 to 40.0 BPM
-Minimum conductivity: 20μS/CM PH-PT
-Measuring range: 0 to 14.0
-Reminder function for calibration and standard check DAF
-Dissolved air flotation
-Flow rate 0.05-15.0 BPM Source
-Pipeline
-20,000 BPD T-CW1
-500 Barrel capacity
-1 FRAC tank

FIG. 1A

P-MF1
-Media filter feed pump
-460V 60HZ
-3 phase
-TBD kw
-TBD FLA

T-SLDG
-Hydrocarbon
-Oil
-Paraffin
-Asphaltene

No-limit adaptive process
-System adaptable to any
components
-Capable of handling any
type of water-treatment P-NAP1
-No-Limit adaptive
process feed pump
-460V 60HZ
-3 phase
-TBD kw
-TBD FLA MF
-Media filter
-Capable of filtering
below 1 micron

PORTABLE SYSTEM FOR PURIFICATION OF LIQUIDS

CROSS-REFERENCE TO RELATED APPLICATIONS

This application is a continuation of U.S. patent application Ser. No. 16/347,576 filed May 4, 2019, which is a U.S. National Stage of International Application No. PCT/US2017/060151 filed Nov. 6, 2017, which claims the benefit of U.S. Provisional Application No. 62/418,193 filed Nov. 6, 2016, all of which are incorporated by reference herein as if reproduced in their entireties.

BACKGROUND

Systems for liquid processing and purification are available in a variety of industries. These systems primarily involve chemical processing and filtering and combinations thereof. In general, for high volume liquid purification, large, fixed, expensive and cumbersome machinery is required to process liquids, such as water at levels sufficient to meet demand.

SUMMARY

In one embodiment, the principles of the present disclosure provide a system and method for high throughput purification of liquids. The system provides multiple portable components that are configured to adjoin making a complete system. Once configured the system provides for a system of liquid purification that produces unprecedented quality and volume with unprecedented flexibility.

In some embodiments principles of the present disclosure provide A system for high throughput purification of liquids comprising a first portable compartment comprising a liquid treatment system; and a media filtration system, a second portable compartment comprising a dissolved air flotation purification system, whereby said liquid treatment system in said first compartment is in liquid communication with said dissolved air flotation purification system in said second portable compartment and said dissolved air flotation purification system in said second portable compartment is in liquid communication with said media filtration system in said first portable compartment.

In some embodiments, principles of the present disclosure provide a system for high throughput purification of liquids comprising a first compartment comprising at least one influx port coupled to a at least one influx line and a first pump capable of pumping a liquid from a first liquid source into a processing line in said system; at least one liquid control valve in line with said influx line and said processing line; at lease first and second additive ports coupled to at least first and second additive sources and a second and third pump capable of pumping an additive from each of said first and second additive sources, respectively, into said processing line; at least one liquid characteristic sensor in line with said processing line; and a first efflux port coupling said processing line to a second compartment. In some embodiments this system further comprises at least first and second filter lines coupled to said processing line via first and second filter valves; at least one pump configured to move liquid from said processing line through said first and second filter valves into said filter lines; at least first and second filters each comprising at least one influx and efflux port in line with said filter lines, said filters configured for a liquid to flow into and out of a first filter into an filter efflux line and optionally into and out of a second filter into said filter efflux line; at least one pressure sustaining valve in line with said filter efflux line; at least one liquid characteristic sensor in line with said filter efflux line; and a second efflux port coupling said filter efflux line to said second compartment.

In some embodiments principles of the present disclosure provide a system described above and further comprising at least a first influx port coupled by a connection line to an efflux ports from said first compartment, wherein the compartment one effluent is flowed into a dissolved air flotation canister in said second compartment; an air source operationally connected to said second canister for applying dissolved air to the compartment one effluent in said second canister; and a scraper disposed horizontally along the top of the liquid level in said second compartment wherein said paddlewheel is capable of rotating around two rotational ends and wherein said paddlewheel when moving is capable of removing debris from the top of said liquid level; a debris collection chamber positioned adjacent to said paddlewheel to collect said debris.

In some embodiments principles of the present disclosure provide a portable system for high throughput liquid purification comprising a first portable system comprising a pump configured to access a liquid source by a system influx line, said pump configured to pump said liquid into a processing line in said first system, said processing line connected to at least one of additives for treatment of said liquid and at least one liquid characteristic sensor in line with said processing line, said first portable system further comprising a first and second filter system in liquid communication with said system influx line by a first filter line, the access to said first and second filter system regulated by at least one valve, a second portable system comprising at least a first influx port coupled by a connection line to an efflux ports from said first portable system, wherein the effluent from said first portable system is flowed into a dissolved air flotation canister in said second portable system, said second portable system comprising an air source operationally connected to said second portable system for applying dissolved air to the effluent from said first portable system; and a scraper disposed horizontally along the top of the liquid level in said second portable system wherein said paddlewheel is capable of rotating around two rotational ends and wherein said paddlewheel when moving is capable of removing debris from the top of said liquid level, a debris collection chamber positioned adjacent to said paddlewheel to collect said debris; and said second portable system comprises a removal port connected to a removal line, said removal line configured to remove liquid from said second portable system.

It is contemplated that any embodiment of a method or composition described herein can be implemented with respect to any other method or composition described herein.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

As described above, systems have been used for purification of liquids. While any liquid finds use in this invention, in preferred embodiments water purification is performed. In some embodiments water may be contaminated with any of a variety of contaminants including chemicals such as salts or hydrocarbons including oil and gas. In some industries, such as oil drilling and fracking, tremendous volumes of water are required to perform the required tasks and tremendous volumes of waste water purification are produced. Despite the presence of water purification systems, current methods are too slow and inefficient resulting in a bottleneck and considerable expense in the process. Accordingly, there exists a need for improved systems of liquid purification.

The present disclosure for the first time provides a portable and high-throughput system for liquid purification. The system comprises multiple portable and reconfigurable units that can be transported using conventional equipment such as trucks and trailers and can be assembled quickly and easily on a work site, such as a drilling site. Notably, the system is easily disassembled for transporting to a second site. In some embodiments the system provides at least a first and second portable compartment, for instance a trailer, containing features of the system. For instance, in some embodiments principles of the present disclosure provide a system for high throughput purification of liquids comprising a first portable compartment comprising a liquid treatment system; and a media filtration system, a second portable compartment comprising a dissolved air flotation purification system, whereby said liquid treatment system in said first compartment is in liquid communication with said dissolved air flotation purification system in said second portable compartment and said dissolved air flotation purification system in said second portable compartment is in liquid communication with said media filtration system in said first portable compartment. By "liquid communication" is meant that a pipe or line connects different features such that liquid may flow between them.

Figure 1B:
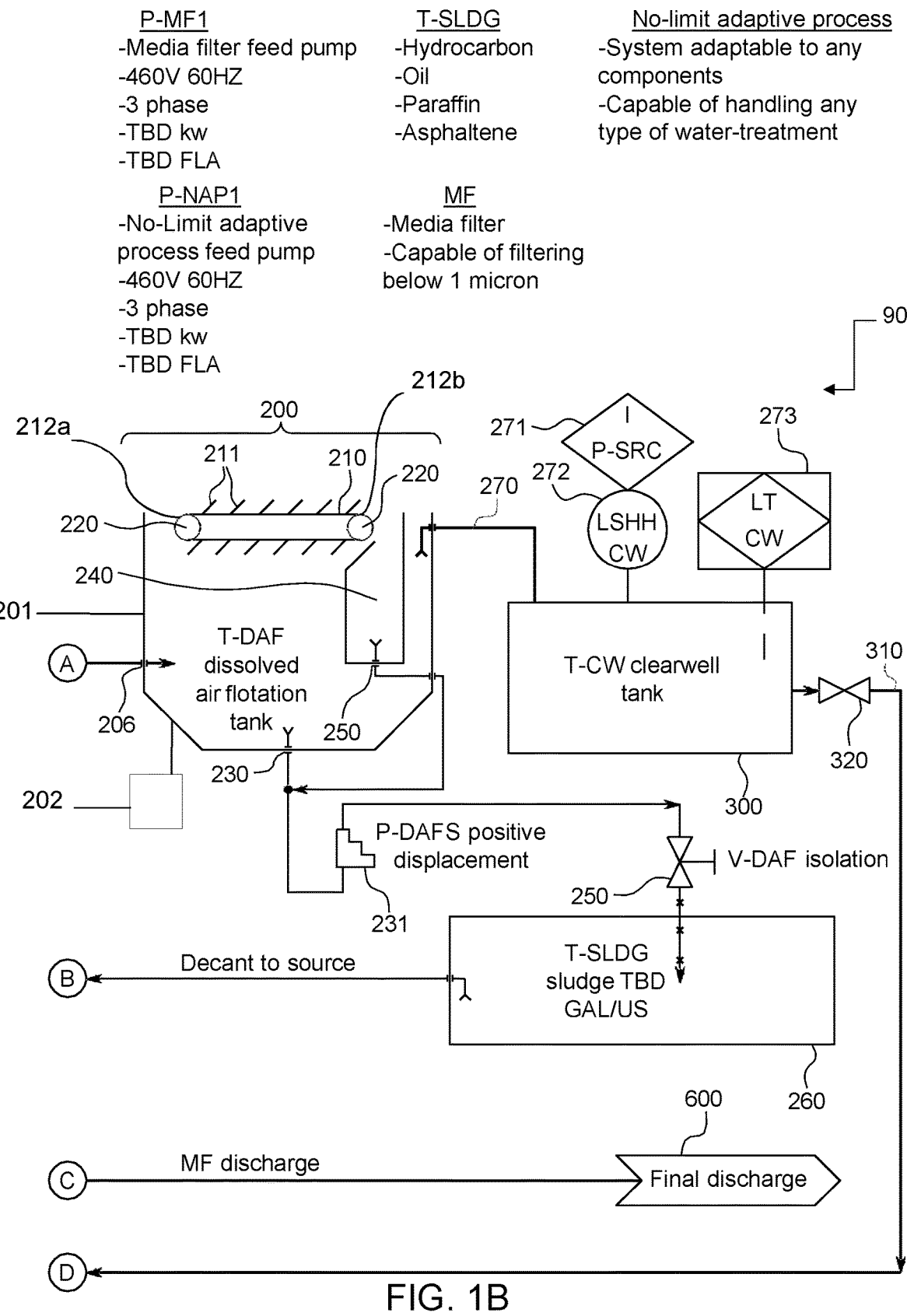
FIG. 1 is a diagram showing an overview of the purification system described herein.

Turning to the figures, FIG. 1 is a summary of the components of the portable liquid purification system, also referred to as liquid treatment system, 90. It should be understood that flow of liquid occurs in the direction of the arrows in the figures. In one embodiment a liquid source 1000 is connected to the first purification component, also referred to as first portable compartment or system, 100 by a line 1010, which in some embodiments is a pipeline. The liquid can be from any source that needs to be cleaned or purified. For instance, the source can be industrial water waste, such as but not limited to waste from oil drilling and fracking sites, salt water, such as but not limited to ocean water, water supplies for cities and the like.

Figure 4A:
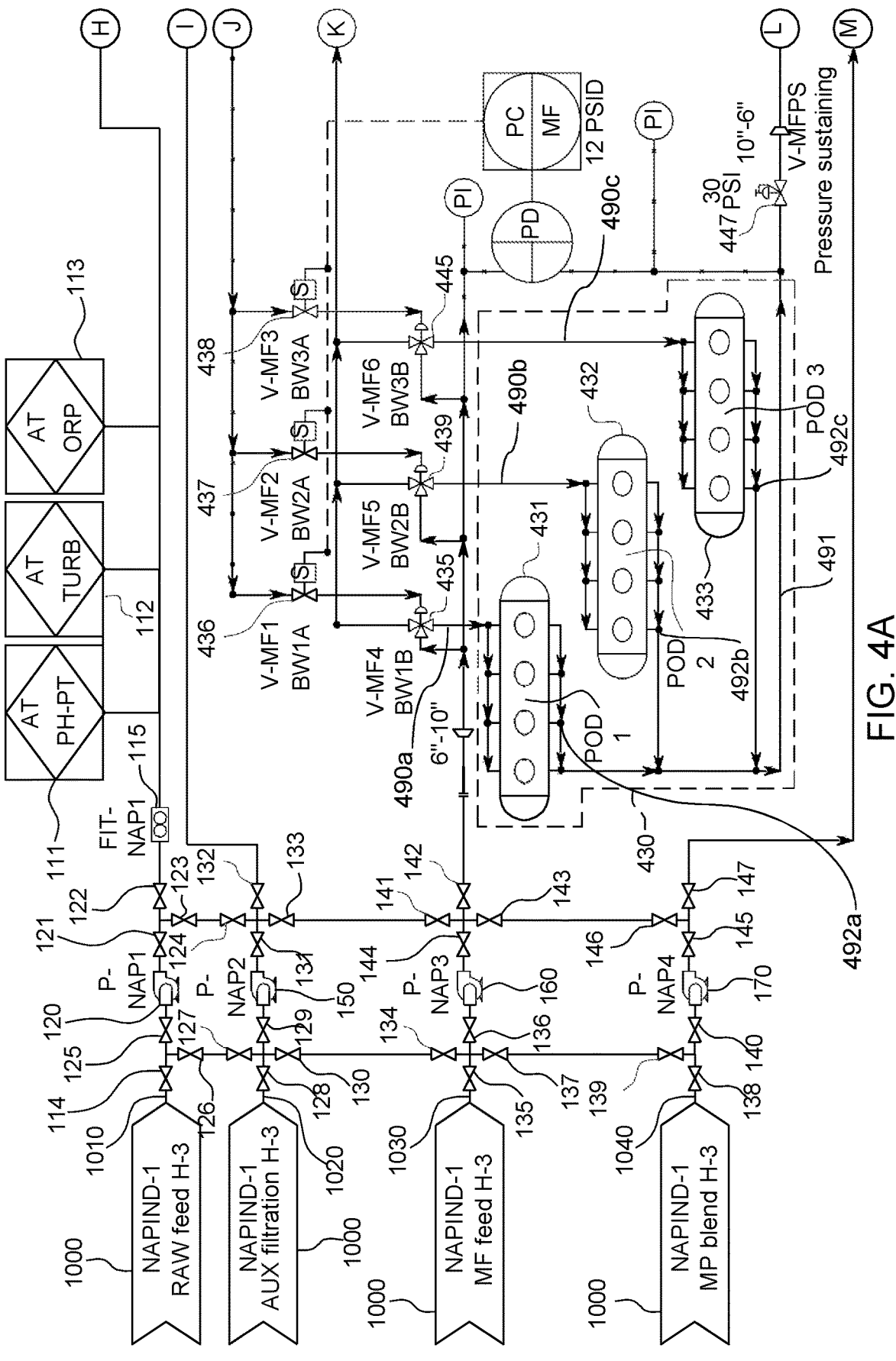
FIG. 4 is a diagram showing elements of the purification system described herein.
Figure 4B:
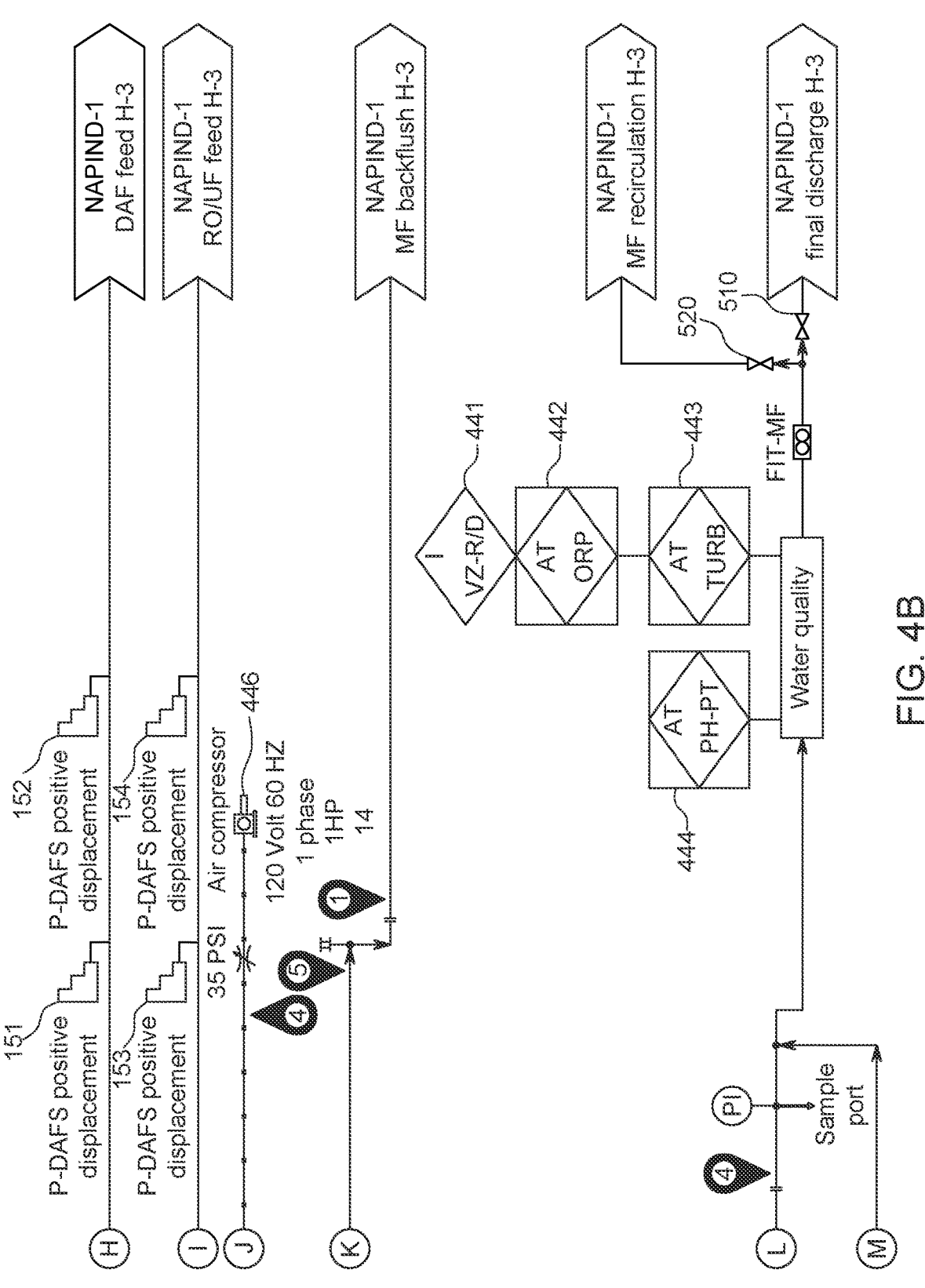

Flow of liquid through the line is regulated by a pump 120 and by at least one valve 114 or a plurality of valves as shown in FIGS. 1 and 4 (114, 125, 121, 122). In one embodiment the liquid passes through an additive treatment section in which chemicals are added to regulate or modify properties of the liquid. Additives may include but are not limited to basic solutions, acidic solutions, nanoparticles and the like. In some embodiments oxidants and base chemicals may be added. In some embodiments the additives include sodium hydroxide, hydrochloric acid, sulfuric acid, chlorine dioxide, hydrogen peroxide, and/or peracetic acid and/or combinations thereof. Such properties include but are not limited to pH, turbidity, oxidation-reduction potential (ORP), oil and grease and the like (111, 112 and 113). Additionally, polymers such as cationic or anionic polymers, may be added to the liquid. The solution then optionally flows through a flow meter 115 and also flows through a mixer 116, such as a static mixer before exiting the purification component 100.

In one embodiment, the liquid then moves to the dissolved air flotation (DAF) tank, also referred to as dissolved air flotation purification system or second portable compartment or system, 200. Dissolved air flotation is a process that consists of saturating the wastewater with air from a compressed air source. In the dissolved air floatation machine, compressed air can be introduced into a rapidly moving stream of wastewater. The compressed air can be introduced into a dissolved air flotation canister 201 or tank, via air source 202, in the form of tiny air bubbles, and as pressure is removed from the saturated water stream, the air bubbles can attach themselves to the contaminants in the water stream. As some contaminants become attached to air bubbles, this can result in a change in the buoyancy of the contaminants that have become attached. This buoyancy change can cause some of the contaminants to float to the surface of the water, where they can be skimmed from the surface. At the same time, some of the more dense contaminants can sink, where they can be collected from the bottom of the tank. As a result, in some cases, approximately the middle 75% of the waste water that flows through the middle portion of the tank will not need skimming or sediment collection which can be due to the air bubbles that are introduced into the tank. DAF tanks are generally described in detail in US 20160060137, US 20140319036 and US 20130112626, which are expressly incorporated herein by reference.

Entry of liquid may be regulated by an influx port 206 that connects to the efflux line 205 from the additive treatment section. The DAF contains at least one debris removal system, also referred to as paddlewheel or scraper, 210 comprising a belt rotating about two rotational ends 212*a* and 212*b* and two axis of rotation on substantially horizontal plane 220. Extending from the belt are appendages or paddles 211 that may be straight or curved. When curved the concave section is positioned in the direction of rotation while the convex section is position against the direction of rotation. When rotating, the appendages are capable of removing debris from the liquid. By debris is meant any foreign object desired to be removed and may include physical debris, such as trash or chemical debris, such as hydrocarbons (oil and gas) and the like. As the system rotates debris is picked up by the appendages and is deposited in a debris collection compartment 240. In addition, dissolved air is added to the system, which allows the debris to float and be removed from the top of the tank. Heavier debris will sink to the bottom. As such, debris may be removed from the system by orifices in the bottom or near the bottom of the DAF and/or debris collection compartment 230, 250. Movement of the debris is controlled by a pump such as a diaphragm pump 231. Once removed, the debris is carried through a line to a waste holding tank, also referred to as third portable system, 260. Flow of the debris is regulated by at least one valve 250. As needed, the waste is moved from the waste holding tank back to a source 1000 for an additional round of treatment. The holding tank may be open or closed and alternatively may be mobile or stationary.

An alternative path for the liquid in the DAF is to be removed from the DAF by a DAF removal line 270 connected to the DAF via a removal port 240. Of note, the removal port is near the top of the tank but separated from the main body of the tank by the debris collection chamber. In this configuration, the liquid rising to the level of the removal port must flow under the collection chamber. This ensures that the liquid is the cleanest liquid in the tank as the heaviest debris has settled to the bottom but the lighter debris is floating on the top of the liquid in the tank. The liquid being removed is in essence taken from the middle of the tank where the debris-free liquid resides.

Once removed from the DAF, the liquid flows through the line 270 to a Clearwell tank 300 for analysis and storage, or removed from the tank as controlled by valve 320 and through line 310. Optional features associated with the tank 300 include an interlock 271, which controls on/off flow based on water level in the tank. As such, additional features associated with this feature of the tank include level transducer 273 and level switch high, high float (LSHH) 272.

Line 310 flows to a media filtration chamber 430. Flow is regulated by pump 410 and valve 420. Liquid from the media filtration chamber may be used to backwash the system as controlled by valve 530 and as described below, be returned to the source 1000 as regulated by valve 520, or may be sent to final storage 600 as controlled by valve 510. Downstream of the filtration chamber a series of regulatory elements may be included. These include water quality sensors 442, 443 and 444 in communication with an interlock 441, which controls flow and direction of flow depending on the detected liquid characteristics, i.e. based on the sensor readings. Optionally, a flow meter 445, may be in line and downstream of the water quality sensors.

Figure 2:
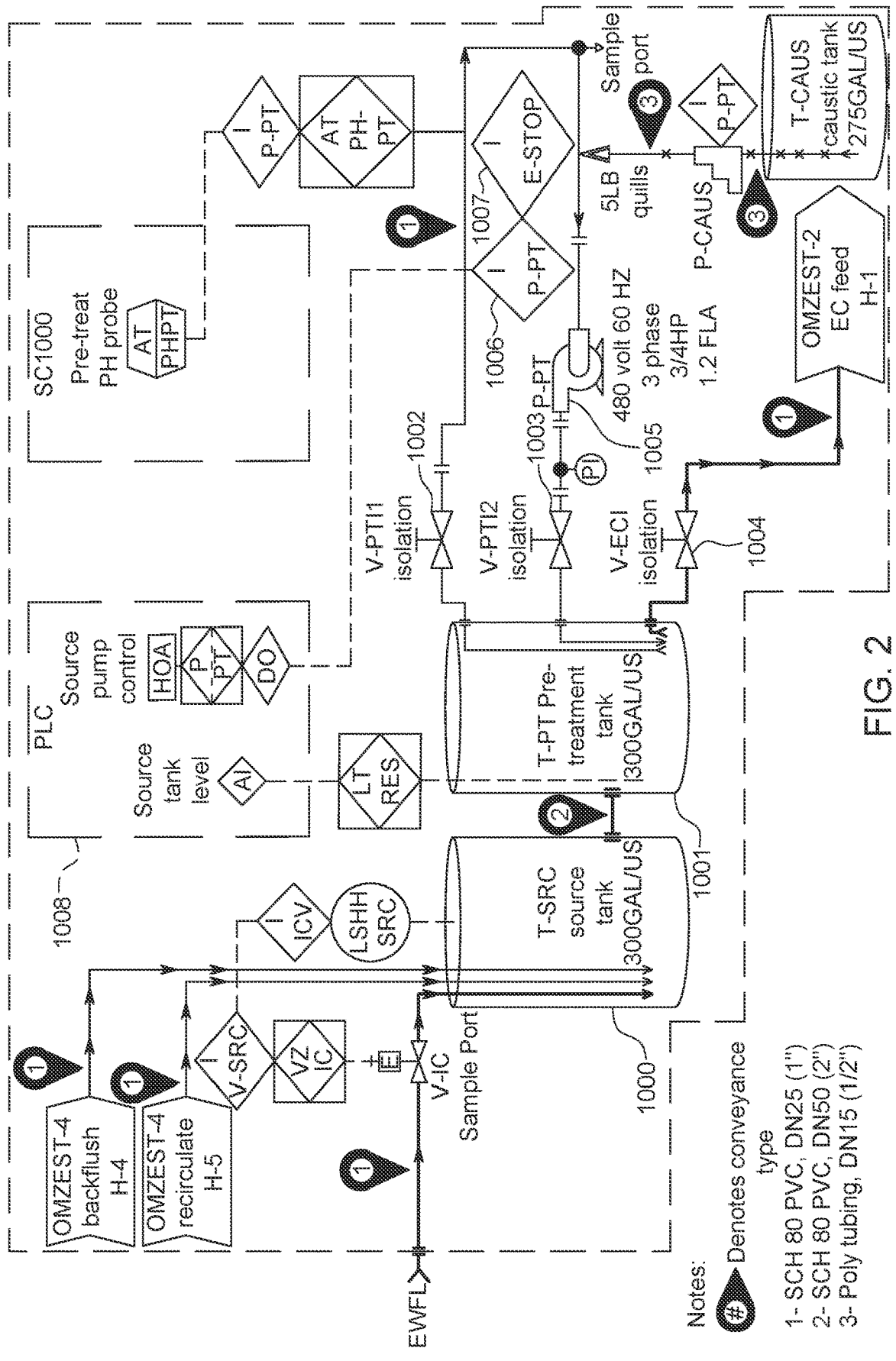
FIG. 2. is a diagram showing the setup of the liquid source to be purified.

FIG. 2 describes the source and setup of source liquid in more detail. Source may be any liquid from any source. In some embodiments the source of liquid to be cleaned is from a pond, lake, ocean or may be from a storage tank at a drilling site. Source liquid 1000 may in some embodiments be stored in tanks and in some embodiments may be pre-treated 1001 with any of the chemicals from above, such as but not limited to sodium hydroxide, hydrochloric acid, sulfuric acid, chlorine dioxide, hydrogen peroxide, and/or peracetic acid and/or combinations thereof. Flow from the tanks is controlled by valves 1002, 1003 and/or 1004 and a pump 1005, and may be regulated by an interlock(s) 1006, 1007 in communication with computer systems 1008 controlling the system that regulates the flow of liquid.

Figure 3A:
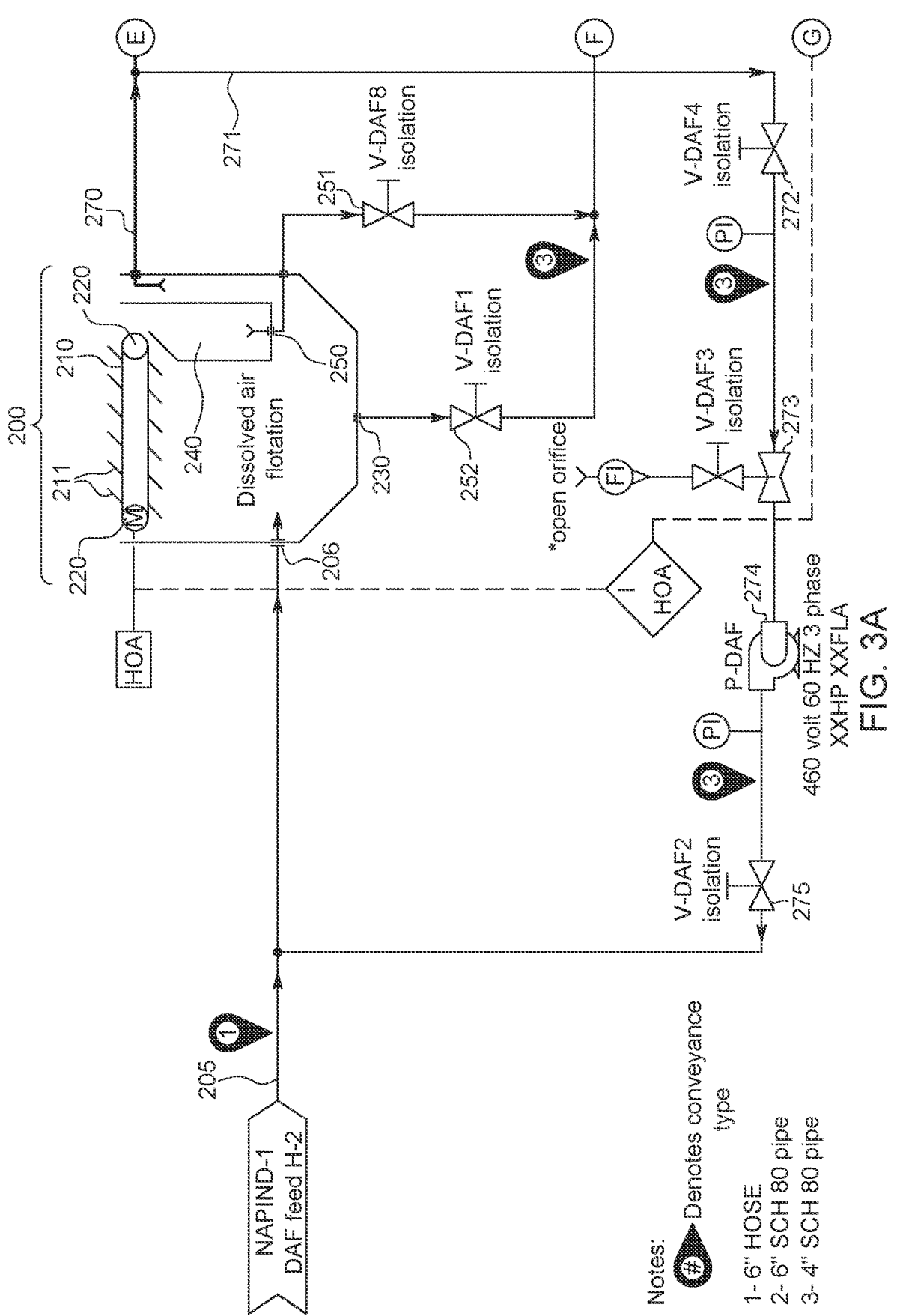
FIG. 3 is a diagram showing purification system including a dissolved air flotation component.
Figure 3B:
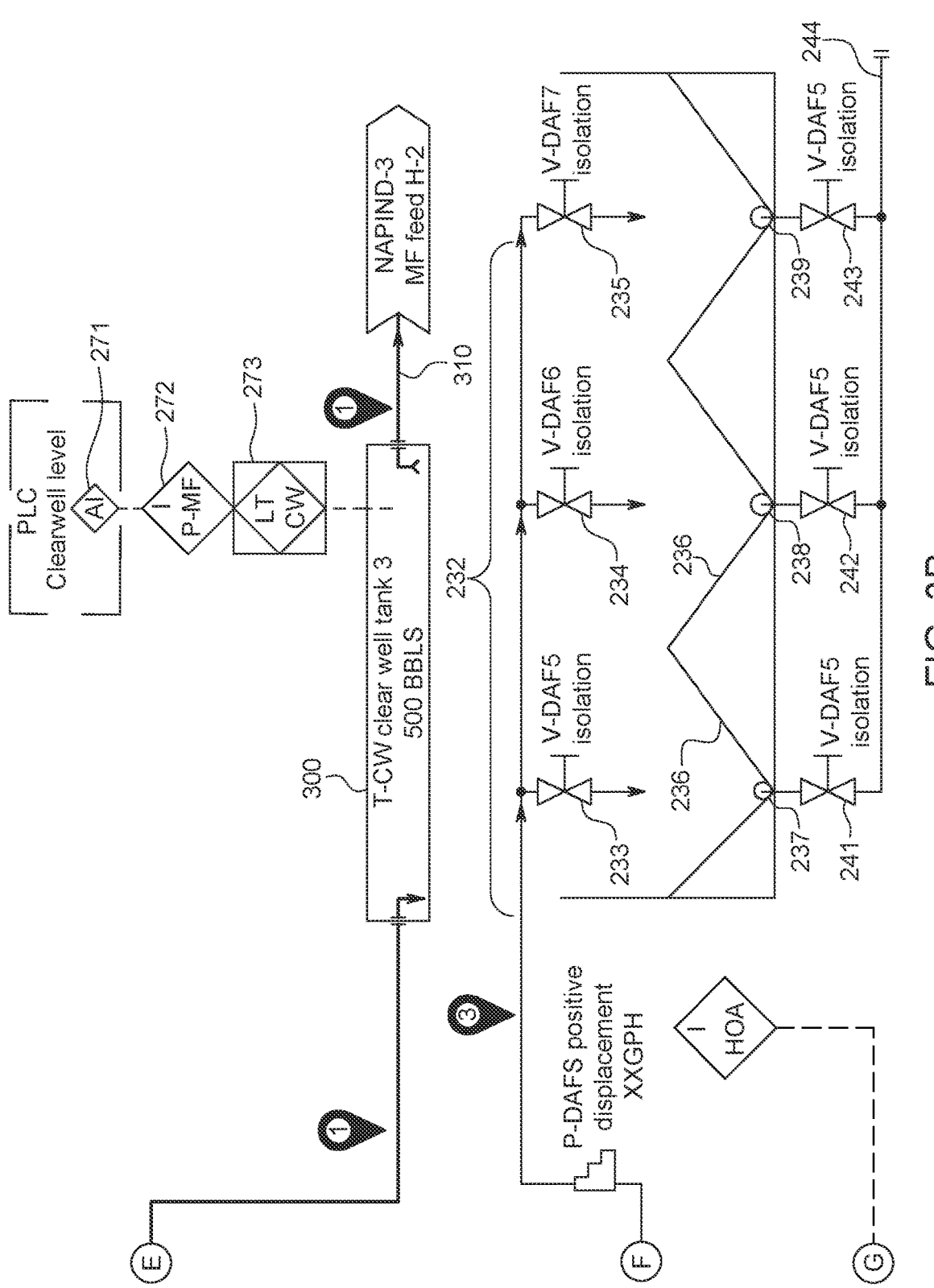

FIG. 3 describes the DAF 200 in more detail and its connection to additional purification processes and systems. Here, the liquid enters the DAF from the side. Debris or waste or sludge removed from the DAF from ports 230 and/or 250 may be further purified by moving through a line regulated by a diaphragm pump 231 to a mesh filtration system 232. Debris flows through valves 233, 234 and/or 235 onto mesh screens 236. The mesh screens form a plurality of "V" shapes which hold the viscous debris material, allowing the liquid to flow from the debris through ports 237, 238 and/or 239 through valves 241, 242 and/or 243 in to a line 244 flowing back to source or other location in the system. In some embodiments the liquid flowing out of the DAF via line 270 is recycled into the DAF by flowing through line 271, which may be regulated by valves 272, 273 and/or 275 and the flow may be controlled by pump 274.

FIG. 4 shows optional routes for the flow of liquid through the system. In some embodiments source liquid flows through the chemical treatment system shown in FIG. 1. Flow may be regulated by valves 114, 125 and pump 120 and may also be regulated by valves 121 and 122. Different treatments 111, 112 and/or 113 may be added to the liquid. Flow may be regulated by pumps, which may be, for instance, diaphragm pumps or positive displacement pumps 151 and/or 152. Flow from this line may then be flowed to the DAF 200. In some embodiments source liquid 1000 flows through a line via valves 128 and 129, which flow may be controlled by pump 150. Direction of the flow may again be regulated by valves 131 and/or 132 and pumps, which may be, for instance, diaphragm pumps or positive displacement pumps 153 and/or 154. Flow may proceed directly to a reverse osmosis/ultrafiltration RO/UF system.

FIG. 4 also describes the media filtration system 430. The media filtration system comprises a series of filters that may be in line and in which liquid flows from one to the other or may be in parallel in which case liquid flows through only one filter and the efflux is collected and kept separate or combined as needed. The media may be the same in each of the filter systems 431, 432 or 433, or may be different. In some embodiments the media is charcoal, glass filters. In some embodiments the media filter is preferably particulate small diameter anthracite coal and the particulates thereof. The anthracite coal particles preferably have a particle size of approximately between 0.5 mm to 1.15 mm in diameter. Another filter media may include particulate garnet and the particulates are preferably approximately 0.25 mm to 0.5 mm in diameter. Another filter media may include either particulate garnet or silica having an average particulate size of approximately between 1.15 mm to 2.0 mm in diameter. Another filter media may include particulate rock, the particulates having an average particulate size of approximately between 0.3 inches (0.7 cm) and 0.85 inches (2.2 cm) in diameter. Another filter media may include crushed glass.

The use of crushed glass as a particulate filtration media allows filtration of smaller/finer particles from the fluid due to the configurations and edge portions of the glass particles. Use of crushed glass as the filter media allows the instant system for removing contaminants from fluids to remove particles down to approximately 8 microns in size. Another media is manufactured by Yardney™ Water Filtration Systems of Riverside Calif, USA. IMA-65 has a unique property of chemically reacting with contaminants such as, but not limited to, Iron (Fe), and Manganese (Mg), and Arsenic (Ar), and is effective in removing these and other contaminants from the fluid. Further, IMA-65 reduces and/or eliminates the necessity of adding potassium permanganate into the fluid stream to cause effective coagulation, precipitation and filtration. In place of the added potassium permanganate, use of IMA-65 as a filtration media allows small amounts of chlorine (CI) to be used in place of the potassium permanganate. In some embodiments the system also has an ultrafiltration media and RO treatment for the production of highly purified and if needed, deionized water.

In some embodiments the filter bodies are interconnected to one another by known plumbing apparatus and fittings so that inflow of fluid enters the inflow ports of each of the plural bodies generally simultaneously and percolates through the filter medias and exits the outflow ports generally simultaneously. Known plumbing connections communicating with the outflow ports thereafter communicate with selector valves that may be actuated to initiate backwash cleaning operations. In the parallel configuration, liquid efflux from the DAF system flows to the influx of the media filtration where it enters, via first, second, and third filter lines, 490a, 490b, 490c, respectively, the first, second, and third filters 431, 432, 433, respectively, which are controlled by first, second, and third regulatory valves 435, 439, 445, respectively, such as a 3-way valve. Notably, flow also is controlled by valves 436, 437 and 438, which are in communication with an air compressor, which may be regulated to maintain a fixed back-pressure. Following flow through the filter system and exiting first, second and third filters 431, 432, 433, respectively, via ports such as efflux ports 492a, 492b, 492c, respectively, an inline pressure sustaining valve 447 is in place to maintain appropriate pressure. In some embodiments this is from 25-50 psi, more preferably 27-35 psi and more preferably around 30 psi. Also in line following flow through the filter system is at least one liquid characteristic sensor, such as sensors 442, 443, and 444 described above, in line with the filter efflux line 491. Characteristics of the liquid to be analyzed include but are not limited to pH, turbidity, ORP and the like.

After analysis of the liquid, it can be discharged to final discharge or recirculated as needed as controlled by valve 510 or 520, respectively.

One of the many benefits of the system as described herein is that it is conveniently portable. The system can be assembled and disassembled with ease and transported from site to site using conventional and traditional trucks and trailers. In some embodiments the components of the system are affixed to or stored in trailers, making for convenient transportation. In this embodiment, different purification systems are stored in different trailers. For instance, in one embodiment the additive treatment system and media filtration system are stored and transported in one transportation vehicle, such as a trailer, while the DAF is stored in a second transportation vehicle. As needed, additional elements of the system, such as the storage tanks may be stored and/or transported in additional transportation vehicles.

Once configured and assembled, the system can be used in a variety of procedures. In one embodiment once the system is engaged, pumps and valves are turned on and configured to allow flow of liquid from a source into the system. In one configuration, the liquid may flow from the source, through the additive treatment system and directly to the DAF or media filtration system. Alternatively, the source liquid may not need the additive treatment and the system may therefore be configured to flow directly to the media filtration system. In some embodiments, the flexibility of the system is seen in the ability to purify liquid from different sources simultaneously and either be maintained separate or blended as needed.

In one preferred embodiment the purification system is controlled by a computer running software configured to operate the valves and pumps as necessary to purify the source liquid to achieve predetermined parameters. In some embodiments pre-determined parameters include pH from 7.4-8.4, more preferably pH from 7.4-8.2 and an ORP of greater than zero and less than 300, more preferably from 40-200 and more preferably from 90-160.

In some embodiments the sensors are in communication with the computer either by direct wiring or via wireless connection. The software is configured to obtain sensor results and modify valves and pumps accordingly by increasing or decreasing flow, direction, and/or treatment. In some embodiments when the liquid has not achieved appropriate conditions, additional treatments are employed. These may include a repeat of prior treatments or application of new treatments. In some embodiments this includes the use of additional chemicals or filtration steps.

As shown in FIG. 4, the system provides for utmost flexibility in controlling liquid flow. For instance, different source liquids can enter the system through different influx lines 1010, 1020, 1030, and/or 1040 for different but simultaneous processing. Alternatively, the same source liquid may be processed. Notably, the system also allows for use of only a subset of influx lines and downstream processing features. In addition, the system provides for flexibility in controlling the flow of liquid through the system in any customizable direction desired by the use of a plurality of valves. For instance, the flow can be regulated by valves 114, 125, 126, 127,128, 129, 130, 134, 135, 136, 137, 138, 139 and/or 140 in combination with control by pumps 120, 150, 160 and/or 170 in combination with control by valves 121, 122, 123, 124, 131, 132, 133, 141, 142, 143, 144, 145, 146 and/or 147.

Figure 5A:
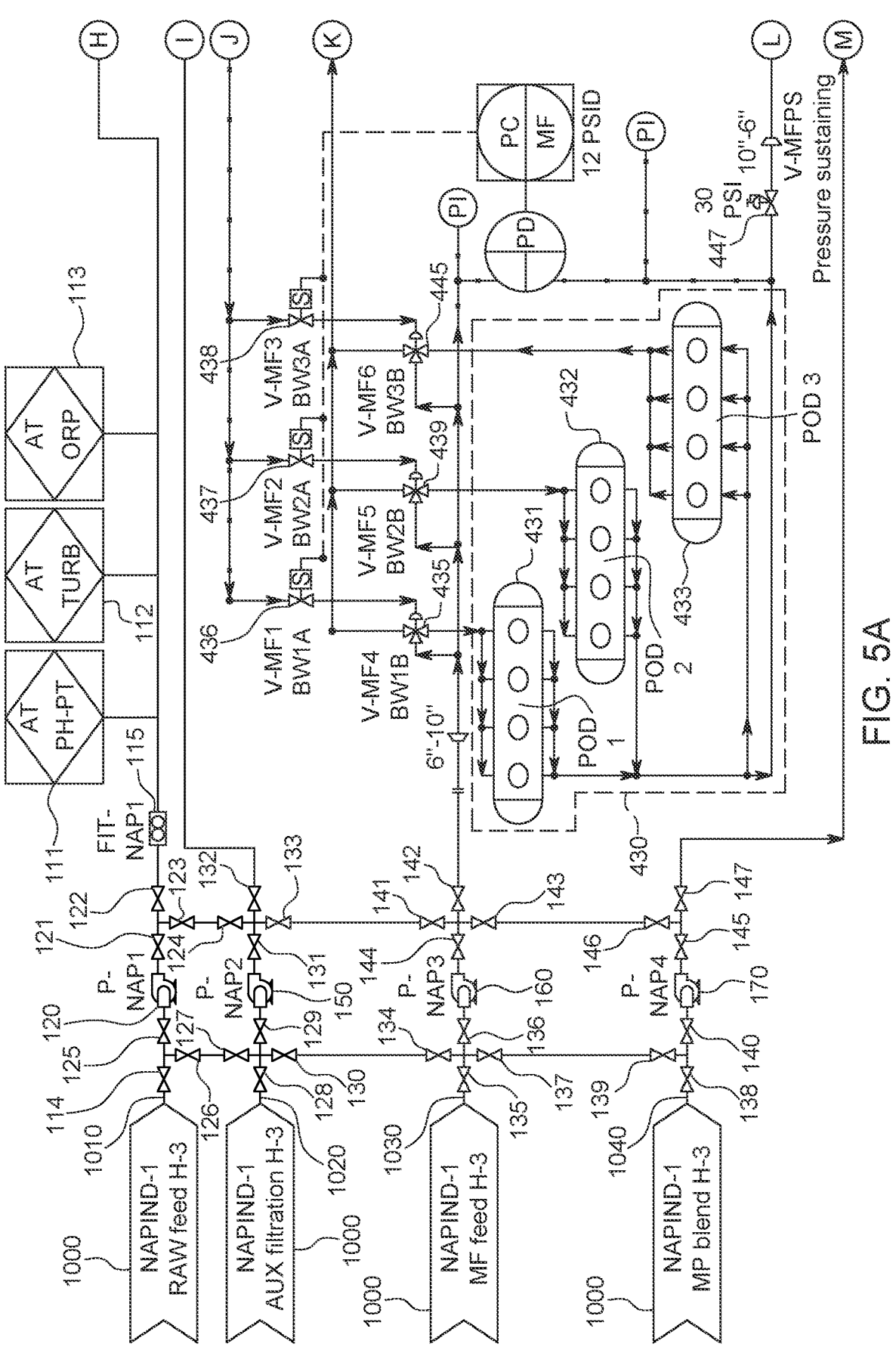
FIG. 5 is a diagram showing elements of the purification system described herein and highlighting the backwash capabilities of the system.
Figure 5B:
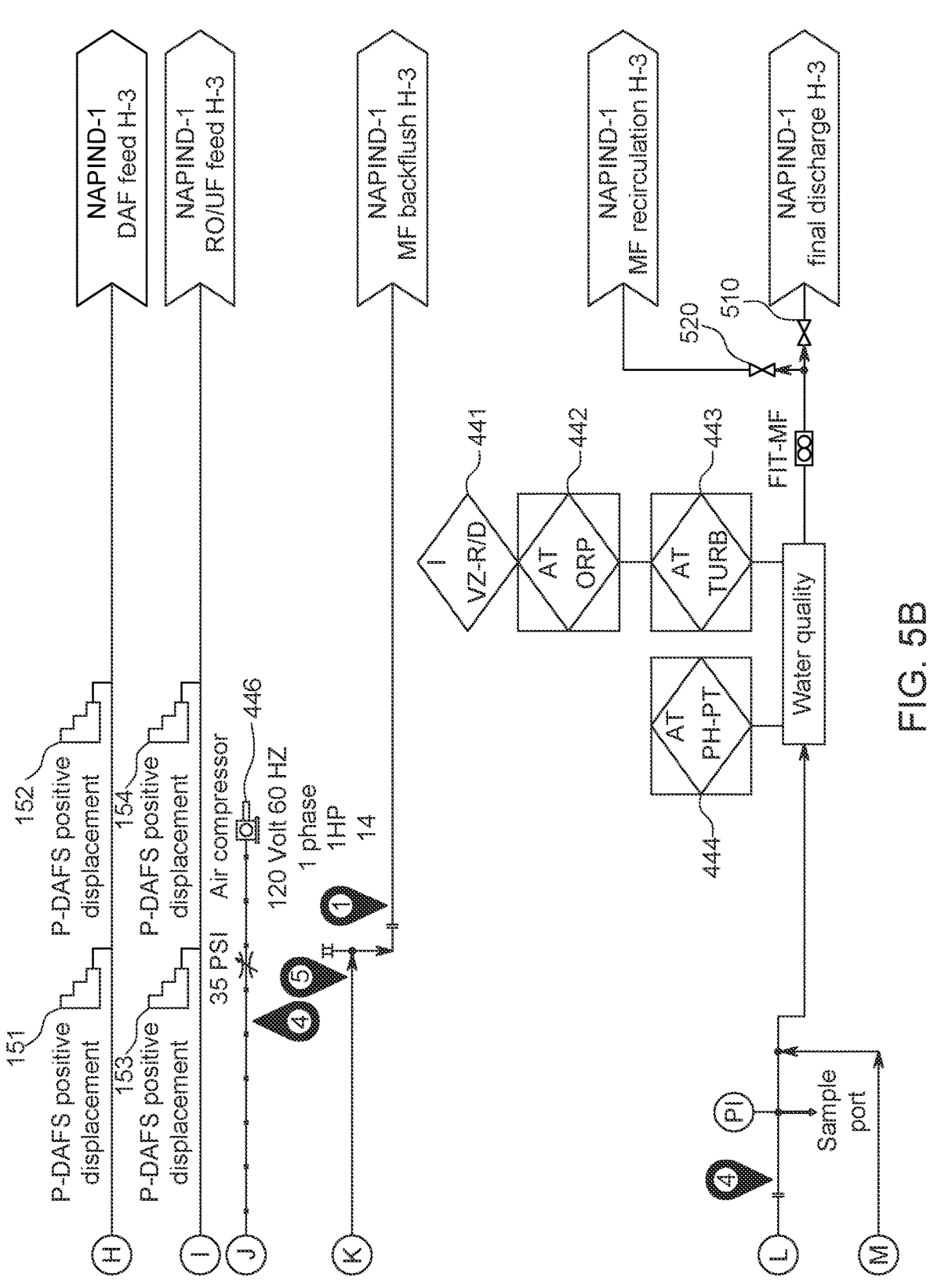

In one embodiment the system allows for real-time backwashing of the filtration system as shown in FIG. 5. Features in FIG. 5 have the same label as in FIG. 4 but show an exemplary reverse liquid flow to backwash one of the media filters. One of skill in the art will understand that the same process occurs to backwash the other media filters as described herein. In some embodiments the system provides for automatic backwashing of the media filtration system. Conveniently, when engaged for backwashing liquid in the system is the backwashing liquid rather than bringing liquid from outside the system online to backwash the filters. That is, other system typically rely in water/liquid external to the purification system to backwash the filter. In contrast, the backwashing system of the present system is a closed liquid system for automatic backwashing of the media filter. In line following flow through each of the media filters is a pressure sustaining valve 447. This valve, as described above, maintains a fixed pressure in the line. When the pressure differential between the top and bottom of a filter unit exceeds at last 5 psi, or at least 10 psi or at least 15 psi or at least 20 psi or between 5-20 psi, or between 7-15 psi, the system will shift to a backwash mode whereby liquid flows from the bottom to the top of the filter. In some embodiments once a first filter is backwashed the system automatically backwashes a second or third or more filter. In some embodiments the filters are backwashed sequentially. In some embodiments the filters are backwashed simultaneously. In this way, the liquid flows through the media filter in the reverse direction through the media filter, and exiting the system, thereby backwashing the filter. By way of non-limiting example, normally flow (as shown in FIG. 4) proceeds through the lines and filters from the top of each of the filters and out the bottom to the bottom line which flows through the pressure sustaining valve 447. However, when the pressure in one of the media filters falls below that of the pressure sustaining valve, the liquid no longer flows through the pressure sensing valve but the flow is altered such that it flows through the bottom of the filter with the low pressure and out the top, thereby backwashing the media filter.

Accordingly the present disclosure provides a mobile system for high-throughput purification of liquid. In some embodiments the system can purify from 100 to 10000 gallons per minute (gpm), more preferably 1000 to 5000 gpm, more preferably around 2000 gpm. One reason for this high throughput volume is that the system uses pipes ranging from 6 to 10 inches in diameter, more preferably from 6-8 inches in diameter, more preferably around 8 inches in diameter. In some embodiments, various pumps according to the present disclosure are capable of pumping liquid at up to around 2000 gallons per minute.

Figure 6:
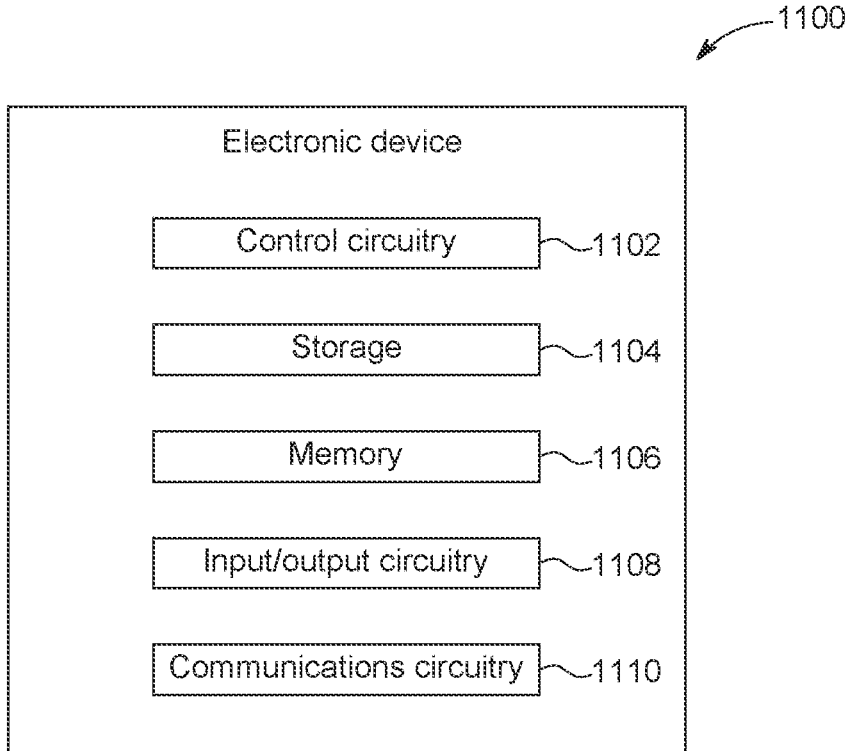
FIG. 6 is a block diagram of an illustrative electronic device for participating in the purification system in accordance with some embodiments of the invention.

FIG. 6 is a block diagram of an illustrative but not limiting electronic device for monitoring and/or controlling the purification system in accordance with some embodiments of the invention. Electronic device 1100 can include control circuitry 1102, storage 1104, memory 1106, input/output ("I/O") circuitry 1108, and communications circuitry 1110. In some embodiments, one or more of the components of electronic device 1100 can be combined or omitted (e.g., storage 1104 and memory 1106 may be combined). In some embodiments, electronic device 1100 can include other components not combined or included in those shown in FIG. 5 or several instances of the components shown in FIG. 6. For the sake of simplicity, only one of each of the components is shown in FIG. 6.

Electronic device 1100 can include any suitable type of electronic device. For example, electronic device 1100 can include a portable electronic device that the user may hold in his or her hand, such as a smartphone (e.g., an iPhone made available by Apple Inc. of Cupertino, Calif or an Android device such as those produced and sold by Samsung). As another example, electronic device 1100 can include a larger portable electronic device, such as a tablet or laptop computer. As yet another example, electronic device 1100 can include a substantially fixed electronic device, such as a desktop computer.

Control circuitry 1102 can include any processing circuitry or processor operative to control the operations and performance of electronic device 1100. For example, control circuitry 1102 can be used to run operating system applications, firmware applications, media playback applications, media editing applications, or any other application. In some embodiments, control circuitry 1102 can drive a display and process inputs received from a user interface.

Storage 1104 can include, for example, one or more storage mediums including a hard-drive, solid state drive, flash memory, permanent memory such as ROM, any other suitable type of storage component, or any combination thereof. Storage 1104 can store, for example, media data (e.g., music and video files), application data (e.g., for implementing functions on electronic device 1100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 1100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 1106 can include cache memory, semi-permanent memory such as RAM, and/or one or more different types of memory used for temporarily storing data. In some embodiments, memory 1106 can also be used for storing data used to operate electronic device applications, or any other type of data that can be stored in storage 1104. In some embodiments, memory 1106 and storage 1104 can be combined as a single storage medium.

I/O circuitry 1108 can be operative to convert (and encode/decode, if necessary) analog signals and other signals into digital data. In some embodiments, I/O circuitry 1108 can also convert digital data into any other type of signal, and vice-versa. For example, I/O circuitry 1108 can receive and convert physical contact inputs (e.g., from a multi-touch screen), physical movements (e.g., from a mouse or sensor), analog audio signals (e.g., from a microphone), or any other input. The digital data can be provided to and received from control circuitry 1102, storage 1104, memory 1106, or any other component of electronic device 1100. Although I/O circuitry 1108 is illustrated in FIG. 6 as a single component of electronic device 1100, several instances of I/O circuitry 1108 can be included in electronic device 1100.

Electronic device 1100 can include any suitable interface or component for allowing a user to provide inputs to I/O circuitry 1108. For example, electronic device 1100 can include any suitable input mechanism, such as for example, a button, keypad, dial, a click wheel, or a touch screen. In some embodiments, electronic device 1100 can include a capacitive sensing mechanism, or a multi-touch capacitive sensing mechanism.

In some embodiments, electronic device 1100 can include specialized output circuitry associated with output devices such as, for example, one or more audio outputs. The audio output can include one or more speakers (e.g., mono or stereo speakers) built into electronic device 1100, or an audio component that is remotely coupled to electronic device 1100 (e.g., a headset, headphones or earbuds that can be coupled to communications device with a wire or wirelessly).

In some embodiments, I/O circuitry 1108 can include display circuitry (e.g., a screen or projection system) for providing a display visible to the user. For example, the display circuitry can include a screen (e.g., an LCD screen) that is incorporated in electronics device 1100. As another example, the display circuitry can include a movable display or a projecting system for providing a display of content on a surface remote from electronic device 1100 (e.g., a video projector). In some embodiments, the display circuitry can include a coder/decoder (CODEC) to convert digital media data into analog signals. For example, the display circuitry (or other appropriate circuitry within electronic device 1100) can include video CODECs, audio CODECs, or any other suitable type of CODEC.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 802. Alternatively, the display circuitry can be operative to provide instructions to a remote display.

Communications circuitry 1110 can include any suitable communications circuitry operative to connect to a communications network and to transmit communications (e.g., voice or data) from electronic device 1100 to other devices within the communications network. Communications circuitry 1110 can be operative to interface with the communications network using any suitable communications protocol such as, for example, Wi-Fi (e.g., a 802.11 protocol), Bluetooth. radio frequency systems (e.g., 900 MHz, 1.4 GHz, and 5.6 GHz communication systems), infrared, GSM, GSM plus EDGE, CDMA, LTE and other cellular protocols, VOIP, or any other suitable protocol.

In some embodiments, communications circuitry 1110 can be operative to create a communications network using any suitable communications protocol. For example, communications circuitry 1110 can create a short-range communications network using a short-range communications protocol to connect to other devices. For example, communications circuitry 1110 can be operative to create a local communications network using the Bluetooth protocol to couple electronic device 1100 with a Bluetooth headset.

Electronic device 1100 can include one more instances of communications circuitry 1110 for simultaneously performing several communications operations using different communications networks, although only one is shown in FIG. 6 to avoid overcomplicating the drawing. For example, electronic device 1100 can include a first instance of communications circuitry 1110 for communicating over a cellular network, and a second instance of communications circuitry 1110 for communicating over Wi-Fi or using Bluetooth. In some embodiments, the same instance of communications circuitry 1110 can be operative to provide for communications over several communications networks.

In some embodiments, electronic device 1100 can be coupled a host device for data transfers, synching the communications device, software or firmware updates, providing performance information to a remote source (e.g., providing riding characteristics to a remote server) or performing any other suitable operation that can require electronic device 1100 to be coupled to a host device. Several electronic devices 1100 can be coupled to a single host device using the host device as a server. Alternatively or additionally, electronic device 1100 can be coupled to several host devices (e.g., for each of the plurality of the host devices to serve as a backup for data stored in electronic device 1100).

Once made, the system finds use in purification of a variety of liquid sources. Purification includes bringing a source liquid into the system for processing. This is in most instances accomplished by engaging one or more pumps in the system such flow of liquid proceeds through the system for the desired outcome as described herein. In one embodiment flow of liquid is controlled manually by changing valves and/or engaging pumps as needed. However, in some embodiments the computer that controls the valves controls the flow and pumps as described herein. For instance, the system provides for a user to program the system to flow the liquid through one or more features of the system such that liquid achieves a particular purity or other characteristic. In this embodiment, the sensors of the system communicate with the computer to provide information on the quality of the liquid and in response the computer modifies the flow of the liquid as needed to achieve pre-determined liquid characteristic profile.

The previous description is of a preferred embodiment for implementing the invention, and the scope of the invention should not necessarily be limited by this description. The scope of the present invention is instead defined by the following claims.

The invention claimed is:

1. A system for purification of liquids comprising:
   a first portable compartment comprising:
      a liquid treatment system, and
      a media filtration system;
   a second portable compartment comprising a separation tank, wherein the liquid treatment system in the first portable compartment is in liquid communication with the separation tank in the second portable compartment and the separation tank in the second portable compartment is in liquid communication with the media filtration system in the first portable compartment, and wherein the media filtration system further comprises:
      one or more lines coupled, via one or more filter valves, to receive liquid from the second portable compartment, the one or more filter valves including a first filter valve and a second filter valve,
      at least one pump configured to move liquid from the second portable compartment through the one or more filter valves into the one or more lines, and
      at least first and second filters each comprising at least one influx and efflux port in liquid communication with the one or more lines, the first and second filters configured for liquid to flow into and out of the first filter into a filter efflux line and further into and out of the second filter into the filter efflux line when the first and second filter valves are in a first position, and wherein the first and second filters are configured for the liquid to flow into and out of the first filter into the filter efflux line and further flow from the filter efflux line into the at least one efflux port and out of the at least one influx port of the second filter when the one or more filter valves are in a second position to backwash the second filter.

2. The system of claim 1, wherein:
   one or more of the at least one pump is configured to pump liquid from a first liquid source into a processing line in the system, wherein the one or more of the at least one pump includes a second pump and a third pump;
   at least first and second additive ports coupled to at least first and second additive sources and the second and the third pump configured to pump an additive from each of the first and second additive sources, respectively, into the processing line;
   at least one liquid characteristic sensor in communication with the processing line; and wherein a first efflux port of the at least one efflux port couples the processing line to the second portable compartment.

3. The system of claim 1, further comprising:

at least one pressure sustaining valve in communication with the filter efflux line;

at least one liquid characteristic sensor in communication with the filter efflux line; and a second efflux port of the at least one efflux port coupling the filter efflux line to the first portable compartment.

4. The system of claim 3, wherein the first and second filters are charcoal or silica filter media.

5. The system of claim 2, wherein the first and second additive sources comprise acid, base or nanoparticles.

6. The system of claim 2, wherein the first liquid source is ocean water, industrial waste or drilling and fracking waste.

7. The system of claim 2, wherein the one or more of the at least one pump is configured to pump liquid from about 500 to about 2000 gallons per minute.

8. The system of claim 2, wherein the at least one liquid characteristic sensor detects characteristics comprising pH, ORP, dissolved oxygen, oil in water, total dissolved solids, or turbidity.

9. The system of claim 8, wherein the at least one liquid characteristic sensor is in communication with a computer comprising software configured to analyze data from the liquid characteristic sensors.

10. The system of claim 9, wherein the one or more filter valves and one or more of the at least one pump is in communication via at least one interlock with a computer and software configured to adjust the one or more filter valves and one or more of the at least one pump.

11. The system of claim 9, wherein software adjusts the one or more filter valves and the one or more of the at least one pump based on data obtained from the at least one liquid characteristic sensor such that the liquid is treated to achieve pre-determined parameters.

12. The system of claim 11, wherein the pre-determined parameters include a pH from 7.4-8.4, and an ORP of greater than zero and less than 300.

13. The system of claim 1, further comprising a third portable compartment comprising a collection tank connected to the second portable compartment by a removal line, the collection tank comprising an efflux line regulated by one of the one or more filter valves, the collection tank efflux line in connection with the media filtration system of the first portable compartment.

14. The system of claim 1, further comprising a backwash line coupled, via one of the one or more filter valves, to receive liquid from the second filter and provide the liquid to the liquid treatment system of the first portable compartment when the first and second filter valves are in the second position to backwash the second filter.

15. A system for purification of liquids comprising:

a liquid treatment system;

a media filtration system; and a separation tank, wherein the liquid treatment system is in liquid communication with the separation tank and the separation tank is in liquid communication with the media filtration system, and wherein the media filtration system further comprises:

one or more lines coupled, via one or more filter valves, to receive liquid from separation tank, the one or more filter valves including a first filter valve and a second filter valve, at least one pump configured to move liquid from the separation tank through the one or more filter valves into the one or more lines, and at least first and second filters each comprising at least one influx and efflux port in liquid communication with the one or more lines, the first and second filters configured for liquid to flow into and out of the first filter into a filter efflux line and further into and out of the second filter into the filter efflux line when the one or more filter valves are in a first position, and wherein the first and second filters are further configured for the liquid to flow into and out of the first filter into the filter efflux line and further flow from the filter efflux line into the at least one efflux port and out of the at least one influx port of the second filter when the one or more filter valves are in a second position to backwash the second filter.

16. The system of claim 15, wherein:

one or more of the at least one pump is configured to pump liquid from a first liquid source into a processing line in the system, wherein the one or more of the at least one pump includes a second pump and a third pump;

at least first and second additive ports coupled to at least first and second additive sources and the second and the third pump configured to pump an additive from each of the first and second additive sources, respectively, into the processing line; and at least one liquid characteristic sensor in communication with the processing line.

17. The system of claim 15, further comprising:

at least one pressure sustaining valve in communication with the filter efflux line;

at least one liquid characteristic sensor in communication with the filter efflux line; and a second efflux port coupled to the filter efflux line.

18. The system of claim 15, wherein the separation tank is a dissolved air flotation purification system.

19. The system of claim 18:

wherein at least one efflux port is coupled such that at least one effluent is flowed into the dissolved air flotation purification system;

an air source operationally connected to the dissolved air flotation purification system for applying dissolved air to the dissolved air flotation purification system and at least one effluent;

a paddlewheel disposed horizontally near a top of the separation tank and configured to rotate around two rotational ends and wherein the paddlewheel when moving is configured to remove debris from near the top of the separation tank; and a debris collection chamber positioned adjacent to the paddlewheel to collect said debris.

20. The system of claim 19, wherein the dissolved air flotation purification system and debris collection chamber each comprise an open orifice at or near the bottom of the dissolved air flotation purification system and debris collection chamber for removal of the contents of the dissolved air flotation purification system and debris collection chamber, each orifice connected to a liquid removal line connected to a mesh filter system.

21. The system of claim 20, wherein the dissolved air flotation purification system comprises a removal port connected to a second liquid removal line, the second liquid removal line configured to remove liquid into a storage tank or recirculate the liquid into the dissolved air flotation purification system.

\* \* \* \* \*